United States Patent

Kim

[19]

[11] Patent Number: 6,028,638
[45] Date of Patent: Feb. 22, 2000

[54] HALF-PIXEL PROCESSING APPARATUS OF MACROBLOCK FOR MOTION COMPENSATION OF MOVING IMAGES

[75] Inventor: Je-Ik Kim, Seoul, Rep. of Korea

[73] Assignee: Samsung Electronics Co., Ltd., Kyungki-Do, Rep. of Korea

[21] Appl. No.: 08/763,897

[22] Filed: Dec. 11, 1996

[30] Foreign Application Priority Data

Dec. 13, 1995 [KR] Rep. of Korea ........................ 95-49398

[51] Int. Cl.[7] .................................................. H04N 7/12
[52] U.S. Cl. ............................................ 348/416; 348/699
[58] Field of Search ...................... 348/416, 402, 348/415, 384, 390, 409, 413, 699; H04N 7/133, 7/137, 7/12

[56] References Cited

U.S. PATENT DOCUMENTS

| | | | |
|---|---|---|---|
| 5,461,423 | 10/1995 | Tsukagoshi ........................... | 348/416 |
| 5,489,949 | 2/1996 | Jeong et al. ........................... | 348/416 |
| 5,493,344 | 2/1996 | Yu ......................................... | 348/402 |
| 5,512,962 | 4/1996 | Homma ................................. | 348/416 |
| 5,532,747 | 7/1996 | Yoon et al. ........................... | 348/402 |
| 5,587,741 | 12/1996 | Kim ...................................... | 348/416 |
| 5,619,282 | 4/1997 | Song ..................................... | 348/416 |
| 5,623,313 | 4/1997 | Naveen ................................. | 348/416 |
| 5,638,128 | 6/1997 | Hoogenboom et al. ............. | 348/416 |
| 5,648,819 | 7/1997 | Tranchard ............................. | 348/416 |
| 5,650,823 | 7/1997 | Ngai et al. ........................... | 348/415 |

FOREIGN PATENT DOCUMENTS

| | | |
|---|---|---|
| 0 407 273 A1 | 1/1991 | European Pat. Off. . |
| 0 626 791 A2 | 11/1994 | European Pat. Off. . |
| 0 712 249 A2 | 10/1995 | European Pat. Off. . |

OTHER PUBLICATIONS

IBM Technical Disclosure Bulletin, vol. 39, No. 12, pp. 161–166.

*Primary Examiner*—Tommy P. Chin
*Assistant Examiner*—Gims Philippe
*Attorney, Agent, or Firm*—Sughrue, Mion, Zinn, MacPeak & Seas, PLLC

[57] ABSTRACT

A half-pixel processing apparatus of a macroblock for motion compensation of a moving image in which NxN pixel data selected for the motion compensation of the moving image is divided into a predetermined unit and half-pixel processed. The half-pixel processing apparatus includes a first unit which sums successive pixel data constituting the N kinds of pixel data and pixel data horizontally adjacent to the successive pixel data constituting the N kinds of pixel data according to a horizontal half-pixel processing signal which is input from an external source. A pipeline unit sequentially stores and outputs the data applied from the first unit. A second unit sums the pixel data output from the pipeline unit and pixel data vertically adjacent to the pixel data output from the pipeline unit according to a vertical half-pixel processing signal which is input from an external source. A data processor half-pixel processes the data applied from the second unit and has the data pass through according to the horizontal half-pixel processing signal and the vertical half-pixel processing signal. Flip-flops divide the data applied from the data processor according to a clock pulse and store the divided data. Multiple-xers select and output data necessary for motion compensation among the data output from the flip-flops.

16 Claims, 4 Drawing Sheets

FIG. 1
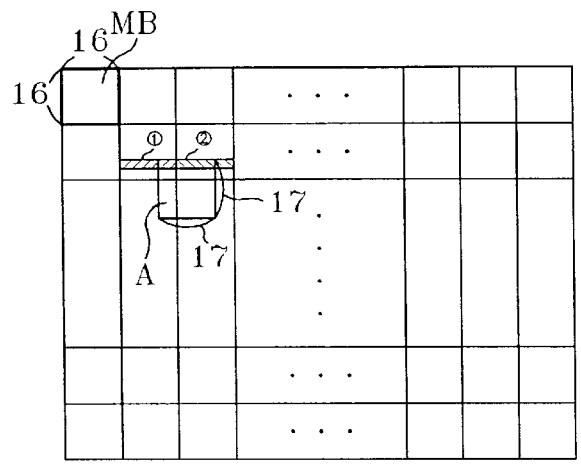
FIG. 2A
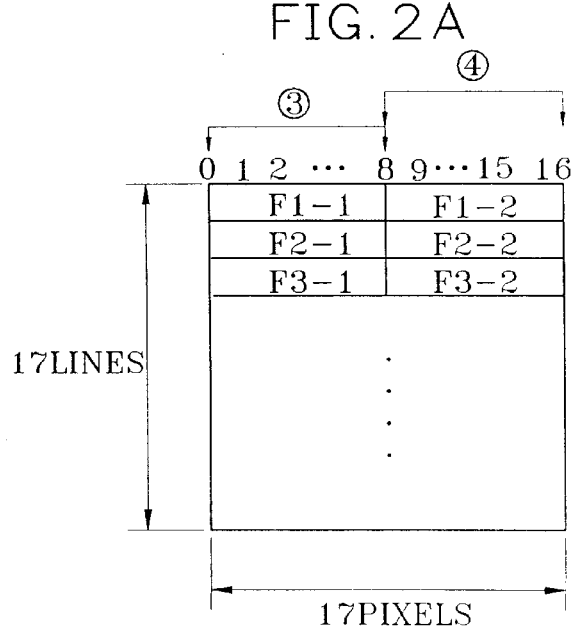
FIG. 2B

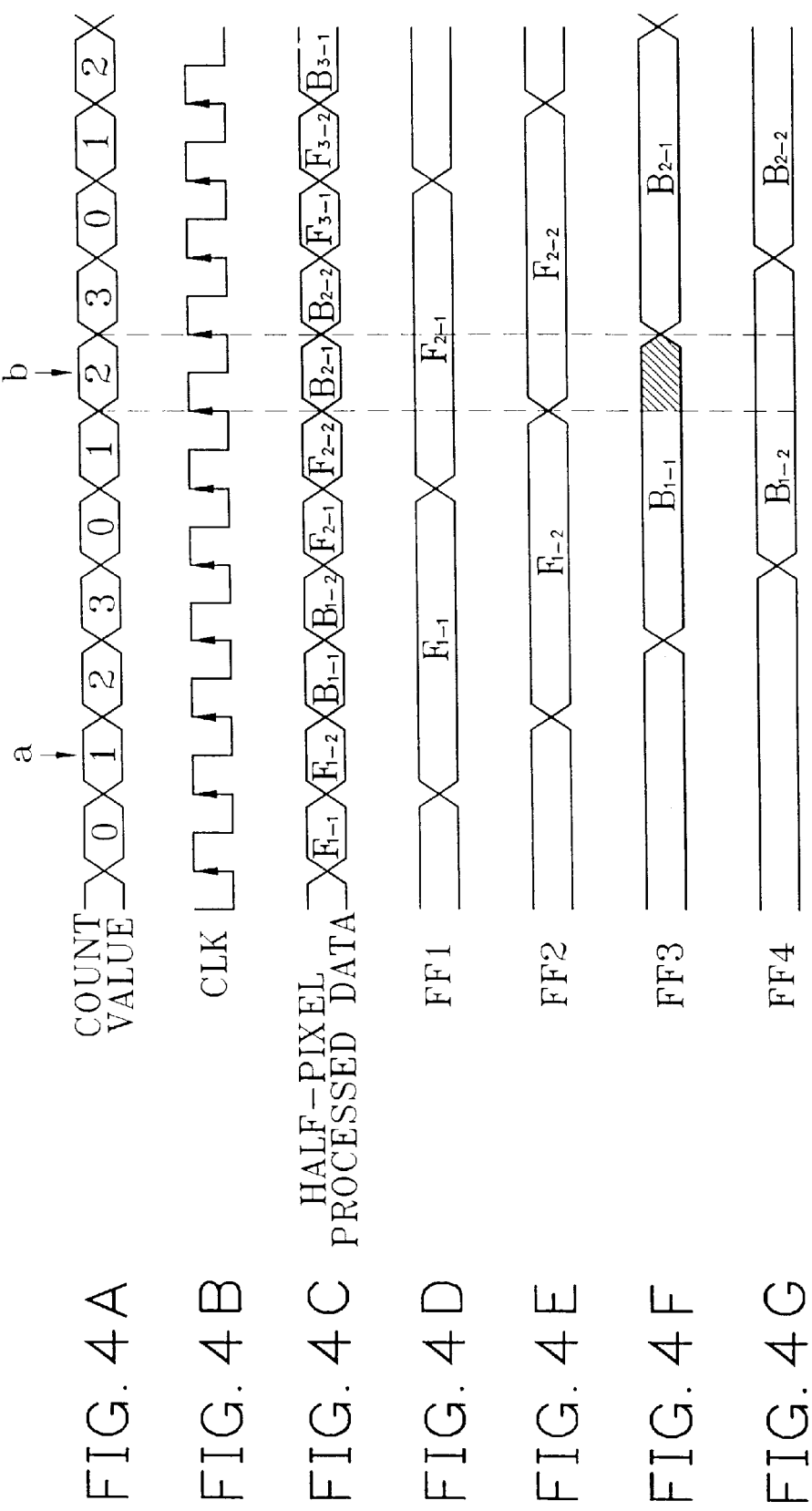

HALF-PIXEL PROCESSING APPARATUS OF MACROBLOCK FOR MOTION COMPENSATION OF MOVING IMAGES

BACKGROUND OF THE INVENTION

1. Field of the Invention

The present invention relates to a half-pixel processing apparatus of a macroblock for motion compensating a moving image, and more particularly, to a half-pixel processing apparatus of a macroblock for motion compensating a bidirectionally-predictive coded picture (B-picture) which performs a motion compensation operation with past and/or future reference pictures.

2. Description of the Related Art

When encoding a motion image signal into digital data and processing the digital data, the amount of data is largely increased when an image signal is moving. To solve this data increase problem, a compression technology of compressing motion image data has been developed which removes redundant data of the motion image signal.

To effectively compress motion image data, three types of pictures such as an intra-coded picture (I-picture), a predictive-coded picture (P-picture) and a bi-directionally-predictive-coded picture (B-picture) are defined in the Moving Picture Experts Group (MPEG) standard. The I-picture is defined as being encoded without reference to the other pictures, the P-picture is defined as being encoded using motion compensated prediction from a past I-picture or P-picture, and the B-picture is defined as being encoded using motion compensated prediction from a past and/or future I-picture of P-picture.

The MPEG-2 standard adopts a half-pixel processing method for a more accurate motion compensation operation. The half-pixel processing method obtains interpixel data by averaging data of horizontally and/or vertically neighboring pixels. A conventional half-pixel processing method reads vertically neighboring 16 pixels per macroblock at a time for horizontal half-pixel processing, to average horizontally neighboring two pixels, and reads horizontally neighboring 16 pixels per macroblock at a time for vertical half-pixel processing, to average vertically neighboring two pixels. Since screens of pictures which are located in the front area or the rear area thereof for a motion compensation of the B-picture, a memory for separately storing data of the pixels of the previous line is required to process a half-pixel of a macroblock. Also, it is impossible to successively output data.

SUMMARY OF THE INVENTION

To solve the above problems, it is an object of the present invention to provide a half-pixel processing apparatus of a macroblock for motion compensation of a B-picture, in which pixel data necessary for half-pixel processing is stored and at the same time sequentially output via a pipeline including latches, and data which has passed through the pipeline and is half-pixel processed is successively selected and output for motion compensation.

To accomplish the above object of the present invention, there is provided a half-pixel processing apparatus of a macroblock for motion compensation of a moving image in which NxN pixel data selected for the motion compensation of the moving image is divided into a predetermined unit and half-pixel processed. The half-pixel processing apparatus has a first means which sums successive pixel data constituting the N kinds of pixel data and pixel data horizontally adjacent to the successive pixel data constituting the N kinds of pixel data according to a horizontal half-pixel processing signal which is input from an external source. A pipeline means sequentially stores and outputs the data applied from the first means. A second means sums the pixel data output from the pipeline means and pixel data vertically adjacent to the pixel data output from the pipeline means according to a vertical half-pixel processing signal which is input from an external source. A data processing means half-pixel processes the data applied from the second means and has the data pass through as it is, according to the horizontal half-pixel processing signal and the vertical half-pixel processing signal. A flip-flop means divides the data applied from the data processing means according to clock and stores the divided data respectively. A multiplexing means selects and outputs data necessary for motion compensation among the data output from the flip-flop means.

BRIEF DESCRIPTION OF THE DRAWINGS

The preferred embodiments are described with reference to the drawings wherein:

FIG. 1 is a conceptual diagram for explaining a 17-pixel by 17-line for half-pixel processing;

FIGS. 2A and 2B are conceptual diagrams respectively showing a 17-pixel by 17-line for half-pixel processing in which FIG. 2A shows a forward picture and FIG. 2B shows a backward picture;

FIGS. 4A–4G are timing diagrams of the flip-flop means in the apparatus of FIGS. 3A and 3B.

DETAILED DESCRIPTION OF THE INVENTION

Referring to FIG. 1 for explaining a 17-pixel by 17-line for half-pixel processing, a macroblock which is a general motion compensation unit is constituted by a 16-pixel by 16-line with respect to a luminance signal in the MPEG standard. However, 17 pixels are required for horizontal half-pixel processing and 17 lines of data are required for vertical half-pixel processing. That is, to obtain 17×17 pixel data as shown in FIG. 1 at the time of half-pixel processing a macroblock, 17 pixels in the horizontal direction and 17 lines of data in the vertical direction should be selected.

FIGS. 2A and 2B are conceptual diagrams respectively showing a 17-pixel by 17-line for half-pixel processing in which FIG. 2A shows a forward picture and FIG. 2B shows a backward picture. The half-pixel processing apparatus does not perform a half-pixel processing operation in units of 16 pixels, but does so in units of 8 pixels, as a half-pixel processing unit of a macroblock. That is, the present invention does not adopt a conventional method in which all 17 pixels are read from a first line of a forward picture, and then pixel data of 0th pixel through 15th pixel and pixel data of 1st pixel through 16th pixel is averaged out, to obtain 16 kinds of half-pixel processed data. Instead, the present invention reads 9 kinds of pixel data of 0th through 8th pixel, and averages the 0th through 7th pixel data and the 1st through 8th pixel data to output 8 kinds of half-pixel processed pixel data. Thereafter, the present invention reads 9 kinds of pixel data of the 8th through 16th pixel, and averages the read pixel data to output 8 kinds of half-pixel processed pixel data. Using such a method, the half-pixel processing apparatus can perform a half-pixel processing operation with respect to signals of U and V components, whose basic motion compensation unit is 8×8, as well as a Y signal.

Figure 3A:
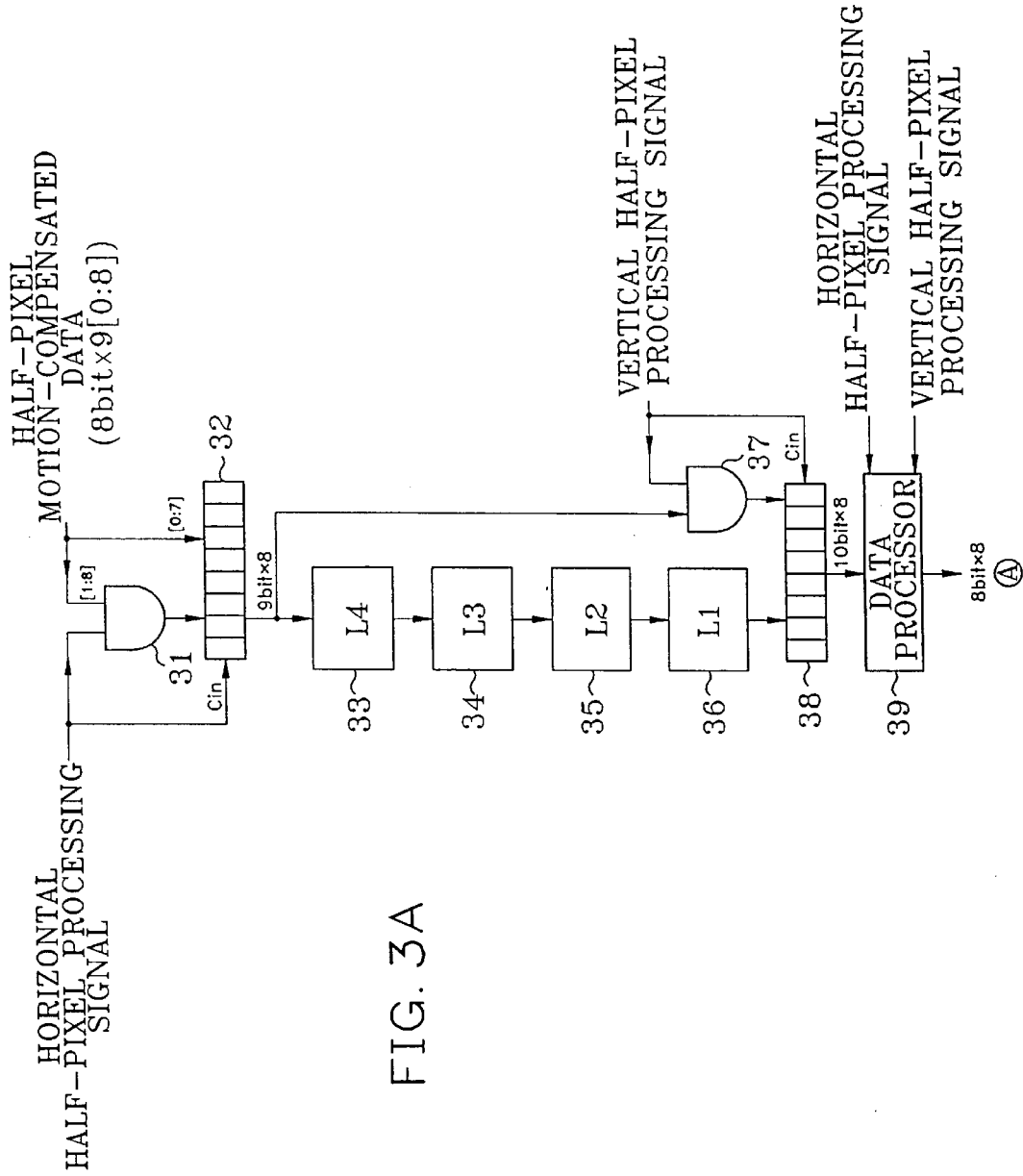
FIGS. 3A and 3B are a block diagram of a half-pixel processing apparatus of a macroblock according to a preferred embodiment of the present invention.
Figure 3B:
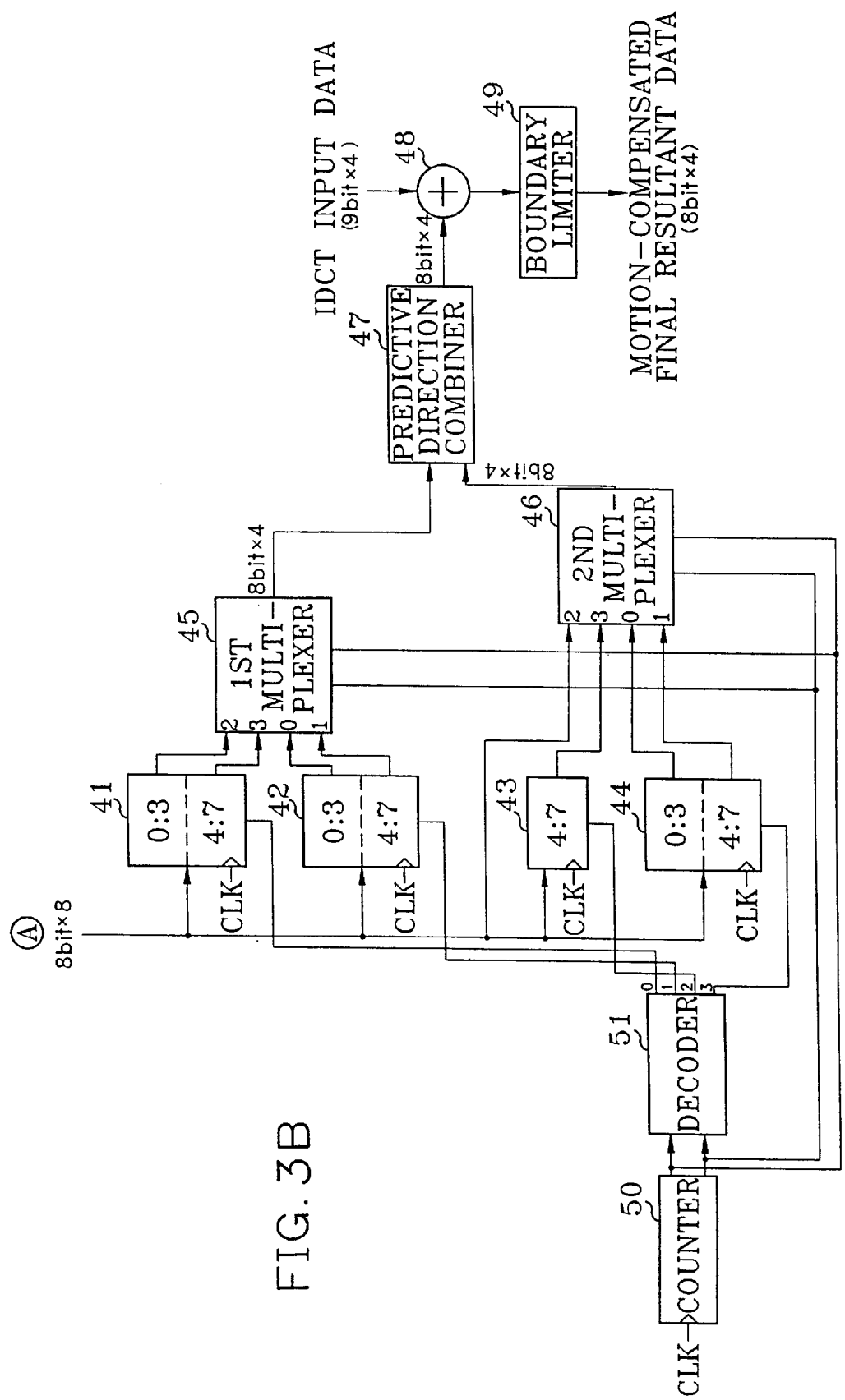

FIGS. 3A and 3B are a block diagram of a half-pixel processing apparatus of a macroblock according to a preferred embodiment of the present invention. First, the half-pixel processing apparatus receives data (F1-1 in FIG. 2A) of 9 pixels [0:8] of a forward picture for half-pixel processing. Data of the lower 8 pixels [0:7] among the data of the 9 pixels [0:8] of the forward picture is applied to a first adder 32, and data of upper 8 pixels [1:8] is applied to a first AND gate 31. A horizontal half-pixel processing signal is applied from an external source to the first AND gate 31; a logic signal "0" is applied for non-horizontal half-pixel processing, and a logic signal "1" is applied for horizontal half-pixel processing. When a logic signal "0" is applied to the first AND gate 31 for the non-horizontal half-pixel processing, the output of the first AND gate 31 is "0," and thus only [0:7] data is input to the first adder 32. In the case for horizontal half-pixel processing, [1:8] data is output to the first adder 32 from the first AND gate 31, and a carry Cin of "1" is applied to the first adder 32. The first adder 32 adds the input [0:7] data and the input [1:8] data including the carry of "1" and outputs 8 kinds of data of 9 bits in which one bit is increased, to a fourth latch (L4) 33. The 8 kinds of data of 9 bits in which one bit is increased is also output to a second AND gate 37 which is for vertical half-pixel processing data output from a first latch (L1) 36 after passing through the fourth latch (L4) 33, a third latch (L3) 34, a second latch (L2) 35, and the first latch (L1) 36 of FIGS. 3A and 3B.

The half-pixel processing apparatus of FIGS. 3A and 3B receives data (F1-2 in FIG. 2A) of the 9 pixels [8:16] of the first line of the forward picture during the next clock pulse. The [8:16] data is processed the same as the [0:7] data. When the processed result is applied to the fourth latch 33, the data of F1-1 stored in the fourth latch 33 is applied to the third latch 34.

During the following clock pulse, [0:8] data B1-1 (see FIG. 2B) of the first line of the backward picture is applied and processed likewise. When the processed result is applied to the fourth latch 33, the data of F1-2 stored in the fourth latch 33 is applied to the third latch 34 and at the same time the data of F1-1 stored in the third latch 34 is applied to the second latch 35.

During the following clock pulse, [8:16] data B1-2 (see FIG. 2B) of the first line of the backward picture is applied and processed likewise. When the processed result is applied to the fourth latch 33, the data of B1-1 stored in the fourth latch 33 is applied to the third latch 34, the data of F1-2 stored in the third latch 34 is applied to the second latch 35, and the data of F1-1 stored in the second latch 35 is applied to the first latch 36.

During the following clock pulse, [0:8] data F2-1 of the second line of the forward picture is applied and processed likewise. When the processed result is applied to the fourth latch 33, the data of B1-2 stored in the fourth latch 33 is applied to the third latch 34, the data of B1-1 stored in the third latch 34 is applied to the second latch 35, and the data of F1-2 stored in the second latch 35 is applied to the first latch 36, and the data of F1-1 stored in the first latch 36 is applied to the second adder 38. The four latches 33–36 constitute a pipeline structure.

Meanwhile, the F2-1 data processed according to the presence of the horizontal half-pixel processing is simultaneously applied to the fourth latch 33 and to the second AND gate 37. The second AND gate 37 receives a vertical half-pixel processing signal and either outputs the data as it is or outputs "0." That is, the second AND gate 37 receives a vertical half-pixel processing signal of "1" for vertically half-pixel processing and outputs the processed F2-1 data to the second adder 38. In this case, a carry Cin for the second adder 38 is "1." The second AND gate 37 receives a vertical half-pixel processing signal of "0" for non-vertical half-pixel processing and outputs a logic signal "0."

Thus, in the case for the vertical half-pixel processing, the second adder 38 adds the F1-1 data input from the first latch 36 and the F2-1 data output from the second AND gate 37, and the carry Cin of "1." Meanwhile, in the case for the non-vertical half-pixel processing, the output of the second AND gate 37 and the carry Cin are both "0," and the F1-1 data input from the first latch 36 is output.

The data output from the second adder 38 outputs 10 bits by 8 data according to the presence of the horizontal or vertical half-pixel processing at the maximum. In the case when a half-pixel processing operation is performed only horizontally or only vertically, 8 kinds of data of 9 bits is output. In the case when a half-pixel processing operation is performed horizontally and vertically, 8 kinds of data of 10 bits is output. In the case when such a half-pixel processing operation is not performed, 8 kinds of data of 8 bits is output.

A data processor 39 determines whether the input data is divided into 2 or 4 or is output, according to a vertical half-pixel processing signal and a horizontal half-pixel processing signal. That is, the input of 8 kinds of data of 9 bits is divided into 2 for only vertical or horizontal half-pixel processing, the input of 8 kinds of data of 10 bits is divided into 4 for the vertical and horizontal half-pixel processing, and the input data is output unchanged when a half-pixel processing operation is not performed. In this case, a round operation can be easily performed using the carry input by the horizontal half-pixel processing signal or the vertical half-pixel processing signal. In all cases, the data output from the data processor 39 is 8 kinds of data of 8 bits.

The data output from the data processor 39 is applied to the four flip-flops 41–44 shown in FIG. 3B. The four flip-flops 41–44 each receive an enable signal. The enable signals of the four flip-flops 41–44 are generated by a 2-bit counter 50 and a decoder 51. The 2-bit counter 50 outputs a 2-bit count value of 0 through 3 according to an input clock (CLK), and the decoder 51 generates the enable signals of 0 through 3 for the respective flip-flops 41–44, according to the count value which is input on a 2-bit basis.

Each flip-flop 41, 42, 43 or 44 divides the 8-byte data into 2 and stores and outputs the 4-byte data. Particularly, the third flip-flop 43 stores only the lower 4 bytes.

A first multiplexer 45 and a second multiplexer 46 select data using the four flip-flops 41–44 and output the selected data to a predictive direction combiner 47.

FIGS. 4A–4G are timing diagrams of the flip-flops in the apparatus of FIG. 3B. FIG. 4A shows a count value of the 2-bit counter 50, FIG. 4B shows a clock signal, and FIG. 4C shows the half-pixel processed data output from the data processor 39.

When a count value is "0," the first flip-flop 41 is enabled at the rising edge of the following clock and the half-pixel processed 8-byte F1-1 data is divided into the upper 4-byte data [0:3] and the lower 4-byte data [4:7] to store the result.

When a count value is "1," the second flip-flop 42 is enabled at the rising edge of the following clock, and the half-pixel processed 8-byte F1-2 data is stored.

When a count value is "2," the third flip-flop 43 is enabled at the rising edge of the following clock, and the lower 4-byte [4:7] among the half-pixel processed 8-byte B1-1 data is stored. At the same time, the first multiplexer 45 selects the data of [0:3] of the F1-1 data stored in the first flip-flop 41 and the second multiplexer 46 selects the data of the non-stored upper 4-byte data [0:3] among the B1-1 data of the half-pixel processed data. The selected data is output to the predictive direction combiner 47.

When a count value is "3," the fourth flip-flop 44 is enabled at the rising edge of the following clock, and the half-pixel processed B1-2 data is stored. At the same time, the first multiplexer 45 selects the data of [4:7] of the F1-1 data stored in the first flip-flop 41 and the second multiplexer 46 selects the data of [4:7] of the B1-1 stored in the third flip-flop 43. The selected data is output to the predictive direction combiner 47.

Using the count values of 0 through 3 output from the decoder 51 shown in FIG. 3B, it can be seen which flip-flop will be enabled according to the count values thereof. Also, using the count values such as 2, 3, 0 and 1 in the first and second multiplexers 45 and 46, it can be seen which flip-flop will be selected according to the count values thereof.

The predictive direction combiner 47 receives the 4-byte data of the forward picture selected by the first multiplexer 45 and the 4-byte data of the backward picture selected by the second multiplexer 46 and averages the received data and outputs the result to a summator 48.

The summator 48 receives inverse discrete cosine transform (IDCT) data and sums the received IDCT data with the data output from the predictive direction combiner 47 and outputs the result to a boundary limiter 49.

The boundary limiter 49 limits the size of the data in order to output the final 4-byte data which has been motion-compensated.

According to the apparatus of the present invention, the 4-byte data is successfully output per each clock pulse by the first and second multiplexers 45 and 46. Also, if a half-pixel processing unit is 8 bytes, the present invention can be used for processing the signals of the U and V components as well as the Y signal.

While only certain embodiments of the invention have been specifically described herein, it will apparent that numerous modifications may be made thereto without departing from the spirit and scope of the invention.

What is claimed is:

1. A half-pixel processing apparatus of a macroblock for motion compensation of a moving image in which NxN pixel data selected for the motion compensation of the moving image is divided into a predetermined unit and half-pixel processed, the half-pixel processing apparatus comprising:

first means for selectively summing successive pixel data constituting N kinds of pixel data and pixel data horizontally adjacent to said successive pixel data constituting said N kinds of pixel data only upon receipt of a horizontal half-pixel processing signal input from an external source;

pipeline means for sequentially storing and outputting pixel data from said first means;

second means for selectively summing the pixel data output from said pipeline means and pixel data vertically adjacent to the pixel data output from said pipeline means only upon receipt of a vertical half-pixel processing signal input from an external source;

data processing means for half-pixel processing pixel data from said second means and having this pixel data be divided according to a predetermined factor or pass through undivided according to whether either one or both of the horizontal half-pixel processing signal and the vertical half-pixel processing signal have been received;

flip-flop means for dividing pixel data from said data processing means according to a clock pulse and storing the divided pixel data; and multiplexing means for selecting and outputting pixel data necessary for motion compensation among pixel data output from said flip-flop means;

wherein half-pixel processing is performed with respect to both a forward picture and a backward picture.

2. A half-pixel processing apparatus of a macroblock according to claim 1, wherein said pipeline means comprises a plurality of latches in which a first latch of said pipeline means stores pixel data applied from said first means and a last latch of said pipeline means outputs pixel data to said second means.

3. A half-pixel processing apparatus of a macroblock according to claim 1, wherein said first means comprises:

a first AND gate for receiving the horizontal half-pixel processing signal and the successive pixel data constituting the N kinds of the pixel data, and performing logical multiplication; and a first adder for adding pixel data from said first AND gate and the pixel data horizontally adjacent to the successive pixel data.

4. A half-pixel processing apparatus of a macroblock according to claim 1, wherein said second means comprises:

a second AND gate for receiving the vertical half-pixel processing signal and the pixel data vertically adjacent to the pixel data output from said pipeline means, and performing logical multiplication; and a second adder for adding pixel data from said second AND gate and said pipeline means.

5. A half-pixel processing apparatus of a macroblock according to claim 1, wherein said first and second means include an input carry according to the horizontal half-pixel processing signal and the vertical half-pixel processing signal, respectively, and wherein said data processing means rounds pixel data using the input carry according to the horizontal half-pixel processing signal and the vertical half-pixel processing signal, respectively, in order to obtain divide-by-two or divide-by-four pixel data.

6. A half-pixel processing apparatus of a macroblock according to claim 1, wherein said flip-flop means divides pixel data from said data processing means into two parts and stores the two parts.

7. A half-pixel processing method of a macroblock for motion compensation of a moving image in which NxN pixel data selected for the motion compensation of the moving image is divided into a predetermined unit and half-pixel processed, the half-pixel processing method comprising the steps of:

summing firstly successive pixel data constituting N kinds of pixel data and pixel data horizontally adjacent to said successive pixel data constituting said N kinds of pixel data according to a horizontal half-pixel processing signal input from an external source;

sequentially storing and outputting the firstly summed pixel data;

summing secondly the sequentially stored and output pixel data and pixel data vertically adjacent to the sequentially stored and output pixel data according to a vertical half-pixel processing signal input from an external source;

half-pixel processing the secondly summed pixel data and passing this pixel data according to the horizontal half-pixel processing signal and the vertical half-pixel processing signal;

dividing the half-pixel processed pixel data according to a clock pulse and storing the divided pixel data; and selecting and outputting pixel data necessary for motion compensation among the divided pixel data.

8. A half-pixel processing method according to claim 7, wherein said first summing step comprises the steps of:

receiving the horizontal half-pixel processing signal and the successive pixel data constituting said N kinds of the pixel data, and performing logical multiplication; and adding the multiplied pixel data and the pixel data horizontally adjacent to the successive pixel data.

9. A half-pixel processing method according to claim 7, wherein said second summing step comprises the steps of:

receiving the vertical half-pixel processing signal and the pixel data vertically adjacent to the sequentially stored and output pixel data, and performing logical multiplication; and adding the multiplied pixel data and the sequentially stored and output pixel data.

10. A half-pixel processing method according to claim 7, wherein the half-pixel processing step comprises the step of rounding pixel data using an input carry in order to obtain divide-by-two or divide-by-four pixel data.

11. A half-pixel processing method according to claim 7, wherein said dividing step comprises the steps of:

dividing the half-pixel processed pixel data into two parts; and storing the two parts.

12. A half-pixel processing apparatus of a macroblock for motion compensation of a moving image in which NxN pixel data selected for the motion compensation of the moving image is divided into a predetermined unit and half-pixel processed, the half-pixel processing apparatus comprising:

a first AND gate having a horizontal half-pixel processing signal input and a half-pixel motion-compensated pixel data input;

a first adder coupled to the output of said first AND gate, and having a horizontal half-pixel processing signal input and a half-pixel motion-compensated pixel data input;

a pipeline coupled to the output of said first adder;

a second AND gate coupled to the output of said first adder and having a vertical half-pixel processing signal input;

a second adder coupled to the output of said pipeline and to the output of said second AND gate;

a data processor coupled to the output of said second adder and having a horizontal half-pixel processing signal input and a vertical half-pixel processing signal input;

a flip-flop coupled to the output of said data processor and having a clock pulse input;

a multiplexer coupled to the output of said flip-flop; and a motion-compensated final resultant pixel data output.

13. A half-pixel processing apparatus of a macroblock according to claim 12, wherein said pipeline comprises a plurality of latches.

14. A half-pixel processing apparatus of a macroblock according to claim 12, further comprising a predictive direction combiner coupled between said multiplexer and said motion-compensated final resultant pixel data output.

15. A half-pixel processing apparatus of a macroblock according to claim 14, further comprising a summer coupled between said predictive direction combiner and said motion-compensated final resultant pixel data output, and having an IDCT data input.

16. A half-pixel processing apparatus of a macroblock according to claim 15, further comprising a boundary limiter coupled to an output of said summer, and including said motion-compensated final resultant pixel data output.

* * * * *